Oct. 14, 1924.

A. D. MEISELBACH

FORK CROWN

Filed July 3, 1922      2 Sheets-Sheet 1

Witnesses:
W. F. Kilroy
Harry R. L. White

Inventor:
August D. Meiselbach

By Murray, Lotz & Wilson
Attys.

Oct. 14, 1924. 1,511,350
A. D. MEISELBACH
FORK CROWN
Filed July 3, 1922  2 Sheets-Sheet 2

Witnesses:
W. F. Kilroy
Harry R. L. White

Inventor:
August D. Meiselbach
By Murray Lotz & Wilson

Patented Oct. 14, 1924.

1,511,350

UNITED STATES PATENT OFFICE.

AUGUST D. MEISELBACH, OF SHELBY, OHIO, ASSIGNOR TO MARGARET MEISELBACH, OF SHELBY, OHIO.

FORK CROWN.

Application filed July 3, 1922. Serial No. 572,379.

*To all whom it may concern:*

Be it known that I, AUGUST D. MEISELBACH, a citizen of the United States, and resident of Shelby, in the county of Richland and State of Ohio, have invented certain new and useful Improvements in a Fork Crown, of which the following is a specification.

My invention relates to improvements in tubular constructions and has special reference to improvements to what are known as front forks for bicycles and the like.

The object of my invention is to provide a fork particularly a front fork for a bicycle frame in which the fork sides shall be connected to the stem by a pressed sheet metal crown of simple and strong construction; which crown while being made of parts readily produced by the ordinary punch and press method shall afford extended sockets both for the fork sides and the stem; which crown shall be exceedingly light and strong; which shall be made of a minimum number of pieces readily and cheaply produced by ordinary manufacturing processes; and the use of which crown shall result in an exceedingly strong and rigid fork of light weight and one which can be produced at relatively low manufacturing cost.

A particular feature of my invention resides in its hollow box-like solid form, being composed of an outer shell forming the top and sides of the box and an inner sheet metal member forming the bottom of the box and the inner sides of the socket spaces for the upper ends of the fork sides. These two sheet metal members are adapted to be connected by a central thimble forming a socket for the lower end of the fork stem. The crown is completed by brazing together the several parts including the fork sides and the stem.

My novel fork crown is capable of being made either straight on top or curved or with its end portions inclined downwardly to suit the demands. Furthermore, by the use of tubular doweling parts for connecting the fork sides with the crown I am enabled to make flush or smooth joints between the fork sides and the outer ends of the crown, this producing forms which are desirable for some uses.

My invention will be more readily understood by reference to the accompanying drawings forming part of this specification, and in which:—

Figure 1 is a fragmentary front elevation of a fork particularly adapted for use in a bicycle as a front fork and made in accordance with my invention;

Figures 2 and 3 are horizontal sectional views on the lines 2—2 and 3—3 respectively of Figure 1;

Figure 4 is a fragmentary central vertical sectional view on the line 4—4 of Figure 1;

Figure 5:
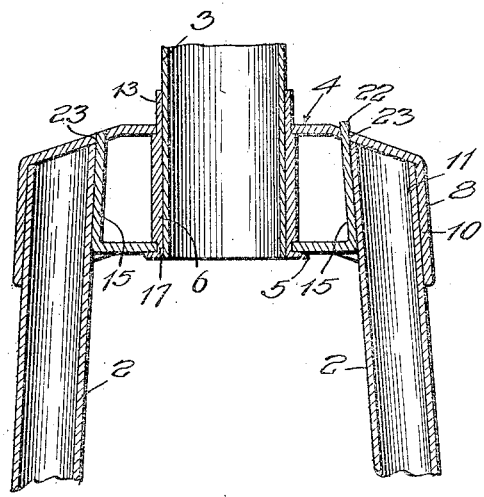
Figure 5 is a fragmentary vertical transverse central sectional view on the line 5—5 of Figure 2.
Figure 6:
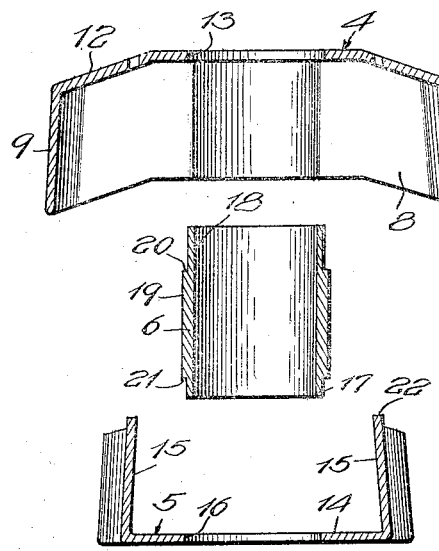
Figure 6 is a central section of the several parts of the crown as shown in Figure 5, the several parts being shown separated from each other and in position to be assembled.
Figure 8:
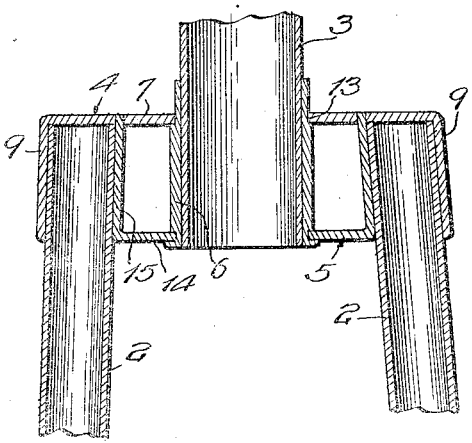
Figure 8 is a sectional view similar to Figure 5 showing a modified shape of crown.
Figure 7:
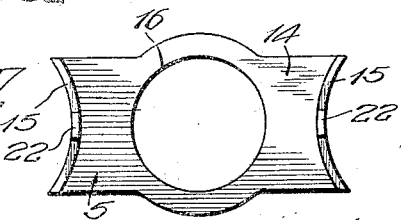
Figure 7 is a top plan view of the inner member of the crown.

In said drawings, 1 illustrates my improved crown, 2 the fork sides and 3 the fork stem. The crown is composed of three pieces, an outer box-like member 4, an inner sheet metal member 5, and a center connecting tube or thimble 6. The member 4 is made in the form of an open bottomed box having a top 7, a peripheral depending wall 8 which extends completely around the edge of the top 7. The end portions 9 of the peripheral wall may be curved to produce the outer walls of sockets 10 to receive the upper ends 11 of the fork sides 2. As shown in Figures 1 to 6 inclusive the member 4 has downwardly inclined end portions 12 giving the crown an artistic shape while the form shown in Figure 8 is flat on top, the top 4 extending horizontally from end wall to end wall. The top wall 7 of the member 4 is provided with a central opening 13 to receive the upper end of the thimble 6. The inside member 5 is adapted to close the open lower end of the box member 4 and is formed for this purpose with a bottom wall 14 which extends into contact with the inner sides of the two fork sides 2. The end portions of the plate of which the member 5 is made are bent upwardly forming inner end walls 15 which rise into contact with the upper wall 7 of the outer member 4 and as best shown in Figure 6 are curved to form the inner walls of the sockets 10 for receiving the upper ends 11 of the fork sides 2. The fork sides are usually and preferably made oval in cross-section as best shown in Figure 3 and it is desirable in forming up a crown to have these fork sides fit snugly within the sockets in the crown so that when the fork is finished by brazing, these brazed joints will be of sufficient area to properly connect the fork sides to the crown.

So far as I am aware no one has heretofore made a crown of sheet metal in which the upper ends of the fork sides are received in sockets integral with the crown. The only way in which this has been accomplished heretofore has been by the production of a crown out of solid material either in the form of a casting or a drop forging and the cost of producing a crown by either of these methods is much greater than the cost of producing a crown by the method herein described.

The inner part 5 is provided with a central opening 16 and is adapted to receive the lower end 17 of the thimble 6, the upper end 18 of the thimble being received in the central opening 13 in the box part 4. The ends 17 and 18 of the thimble 6 are smaller in diameter than the middle portion thus providing a top shoulder 20 and a bottom shoulder 21. The top shoulder contacts with the underside of the top wall 7 of the member 4 and the bottom shoulder 21 contacts with the upper surface of the bottom wall 14 of the member 5, the thimble thus acting as a spacer for these two parts and the lower end 17 is adapted to be formed over as shown in Figure 5 to tightly bind the thimble to the member 5. The ends of the thimble fit tightly within the two holes and when the crown is completed by brazing this thimble is rigidly connected to both the members 4 and 5 and forms a central vertical socket to receive the lower end of the stem 3. The upper end 18 of the thimble projects above the top wall of the crown and it is cylindrical and smooth on its outer surface, as shown, to form a suitable seat for the usual ball bearing race commonly used for mounting the fork in the bicycle frame. For preliminarily securing the two members 4 and 5 together upon the thimble 6 I provide narrow central tongues 22 on the upper ends of the side walls 15 of the member 5 adapted to project through suitable openings 23 which I provide in the top wall 7 of the member 4. These tongues 22 are long enough to project slightly above the top of the member 4 as shown at the right hand of Figure 5 and when riveted down as shown at the left hand in Figure 5 are adapted to retain the three members rigidly assembled during the process of manufacture.

As best shown in Figure 3, the periphery of the bottom plate 14 of the member 5 fits within the lower portion of the side wall 8 of the member 4, the bottom 14 of the member 5 forming a flush closure of the box-like member 4, the joint between the two members being on the bottom surface and not on the side.

In manufacturing crowns in accordance with my invention the three parts as described and as shown in Figure 6 are readily assembled together. The lower end of the member 6 is entered through the hole 16 in the member 5 and its upper end entered through the hole 13 in the member 4 as the members 4 and 5 are assembled together. Thereafter the lower end 17 is spun or formed over to permanently secure the thimble to the member 5 and the projections 22 are riveted down to hold the members 4 and 5 together. Having assembled the crown in the manner described the upper ends of the fork sides being cut off to fit tightly against the upper wall of the member 4 and the lower end of the stem 3 is forced down into the member 6 until its extreme lower end is flush with the extreme lower end of the member. When the several members have thus been assembled the whole connection is brazed by being first dipped into a suitable flux and then into a bath of molten metal remaining long enough in the metal to heat up the joint and permit the brazing metal to enter into all of the contacting joints and thoroughly solidify the parts of the crown and the connections of the crown with the fork sides and stem. The crown being hollow is relatively light in weight and being of box-girder form is exceedingly strong. Furthermore, the contacting portions of the fork sides and stem with the crown are liberal in extent and consequently the structure is exceedingly strong though of light structure.

Figure 9:
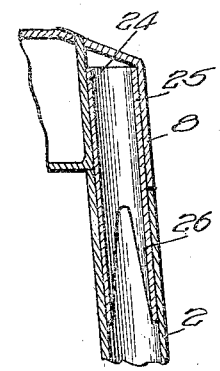
Figure 9 is a sectional view similar to Figure 5 showing a fork with flush joints between the fork sides and crown.

In Figure 9 I have shown a slight modification in that instead of the upper ends of the fork sides being entered into the sockets of the crown, I provide sheet metal doweling members 24 of what are known as the fish-tail form, their upper ends 25 being adapted to fit within the sockets 10 in the crown and their lower fish-tail ends 26 being adapted to receive the upper ends of the fork sides 2. In this manner I am enabled to make what are known as flush joints between the ends 9 of the fork of the crown and the upper ends of the fork sides for the reason that the wall thickness of the fork sides is the same as the thickness of the plate of which the member 4 is made and the extreme upper end of the fork side is formed to make a close joint with the lower peripheral edge of the end 9 and the side walls of the member 4 as best shown in Figure 9. The fish-tail form of dowel is used to avoid an abrupt ending of the lower end of the dowel for the reason that if this is cut off straight it forms a point in the fork side at which distortion may begin.

As many modifications of my invention will readily suggest themselves to one skilled in the art, I do not limit or confine my invention to the specific details of construction and assembly of parts herein shown and described.

I claim:

1. The improvements herein described comprising a fork such as a front fork of a bicycle consisting of tubular fork sides and a tubular stem, a box-like crown connecting the fork sides and stem and made up of a box-like member formed of sheet metal and open on one side, the open side closed by a second sheet metal member having ends formed or bent to project within the box-like member and formed the inner sides of sockets to receive the upper ends of the tubular fork members, a connecting tubular thimble extending from the top to the bottom of the box and doweled in each for receiving the fork stem, the upper end of the thimble projecting above the top wall of the box-like member and in combination with the top wall forming a seat for a ball bearing member.

2. A box-like crown for a fork such as a front fork for a bicycle, the crown comprising a main outer box-like sheet metal member forming the top and sides of the crown and a second inner sheet metal member forming the bottom wall of the crown, the ends of the second member bent upwardly for contact with the top of the crown and curved transversely to form the inner walls of sockets for receiving tubular fork sides, means connecting said ends rigidly with the top wall of the crown, a central connecting tubular thimble extending through and connected to both of said sheet metal members and forming a socket to receive the lower end of a fork stem, the upper end of the thimble projecting above the crown and being smooth on its outer surface.

3. A fork, such as a front fork of a bicycle, comprising a tubular stem and tubular fork sides, a crown connecting the fork sides to the stem, the crown made of sheet metal formed into box-like shape, one face and the sides of the box made of one piece and the opposite face made of a second piece, the ends of the second piece turned inwardly to meet the opposite face, the ends of the box presenting sockets for the upper ends of the fork sides, a central tubular thimble connecting the two pieces and forming a socket to receive the lower end of the stem and its upper end being smooth and projecting above the top wall of the crown, as and for the purpose specified, the several parts permanently joined and formed into a unitary structure by metalizing means such as brazing.

Signed at Shelby, Ohio, this 21st day of June, 1922.

AUGUST D. MEISELBACH.